P. ULMER,

Assignor, by mesne assignments, to H. C. MILLIGAN.

Camp-Spoon.

No. 7,925. Reissued Oct. 23, 1877.

Witnesses;
E. W. Howard
W. E. Chaffee

Inventor:
H. C. Milligan
Assignee of Phillip Ulmer
By Atty Wm. C. Wilshire

N. PETERS, PHOTO-LITHOGRAPHER, WASHINGTON, D. C.

UNITED STATES PATENT OFFICE.

HENRY C. MILLIGAN, OF ELIZABETH, NEW JERSEY, ASSIGNEE, BY MESNE ASSIGNMENTS, OF PHILIP ULMER.

IMPROVEMENT IN CAMP-SPOONS.

Specification forming part of Letters Patent No. 34,338, dated February 4, 1862; Reissue No. 7,925, dated October 23, 1877; application filed October 17, 1877.

*To all whom it may concern:*

Be it known that PHILIP ULMER, late of Philadelphia, in the county of Philadelphia and State of Pennsylvania, did invent a new and useful Improvement in Camp-Spoons, of which the following is a full, clear, and exact description, reference being had to the accompanying drawings, in which—

Figure 3:
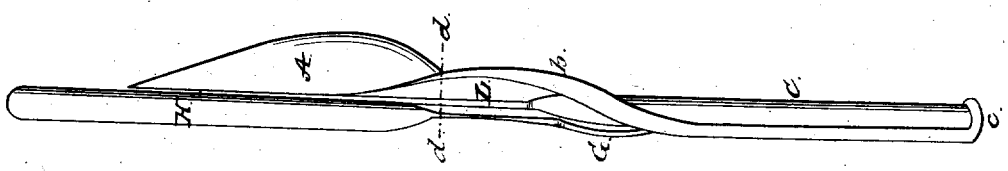
Figure 2:
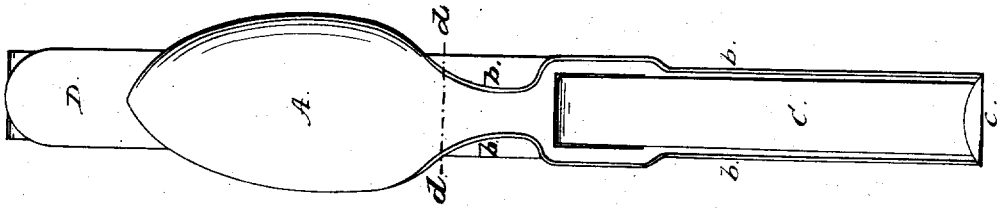
Figure 1:
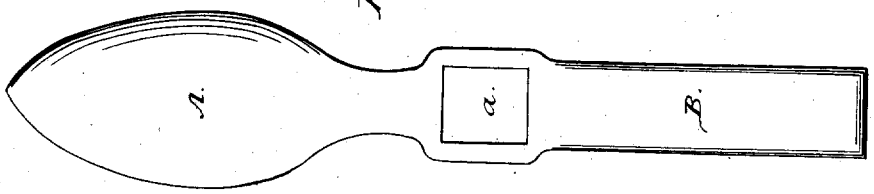

Figure 1 is a top view of a spoon embodying the feature of invention; Fig. 2, a bottom view thereof, having a knife and fork cased therewith; and Fig. 3, an edge view of the spoon with knife and fork secured in position.

Similar letters indicate like parts in the several views.

The invention consists, first, of a sheet-metal spoon formed of a single piece, and having its handle so shaped and punched as to be capable of receiving and holding in position a knife and fork in compact and convenient form; and the invention consists, secondly, in strengthening the handle longitudinally, and at its junction with the bowl, by turning over the edge of the metal to form a flange, all as will be hereinafter more fully set forth.

In the drawing, A represents the bowl of the spoon, from which the handle B rises slightly upward, and then travels in a line about parallel with the plane of the top edge of the bowl. In the oblique or rising portion of the handle an aperture or hole, *a*, is cut to admit the passage of the handle of a knife and the tines of a fork, for the purpose presently explained. The edges of the handle B are turned down to form flanges *b b*, as clearly seen at Figs. 2 and 3, and the extreme end is turned down and returned to form a hook, *c*, to hold the end of a knife-handle in place. The flanges *b b* on the two edges or sides of the handle form guards to retain the handle of an introduced knife against lateral displacement, and also serve to greatly strengthen the handle of the spoon, and especially at that point where the opening *a* occurs, where they may, if desirable, be increased in depth; and as the flanges *b b* also extend to and beyond that point where the bowl ceases and the handle begins, as seen at *d d*, Figs. 2 and 3, that point is very greatly strengthened, and prevents breaking.

The opening *a* in the handle permits the introduction of the handle C of a knife, the blade D resting upon the top edge of the bowl A, and also the introduction above the handle C of the tines G of a fork, the handle H of which rests upon the blade D of the knife. The handle C of the knife is, as before stated, held from lateral displacement by the flanges *b b*, and the hook *c* at the end of the spoon-handle embraces the end of the handle C of the knife, and holds it against displacement vertically or longitudinally when in position for transportation. Thus a knife, fork, and spoon may be put up in compact form for transportation, and be readily separated when desired for use.

It will be observed that the ordinary elasticity of the tines of a fork, together with their curved shape, enables them to be forced into position in such manner as to bind the three things together.

The handle of the spoon at that point where the opening *a* occurs may be made wider than the balance, and, as before stated, the flanges *b b* deeper, to compensate for the weakness induced by the presence of said opening. The flanges *b b*, where they extend around the butt of the bowl, may be of any suitable depth, or extend any desired distance toward the point of the spoon, the outer edge being gracefully curved to make a neat finish.

What is claimed as new, and desired to be secured by Letters Patent, is—

1. A spoon formed, substantially as described, with a hole and flanges to receive and retain in position a knife and fork, as and for the purposes described.

2. A metallic spoon having its handle strengthened longitudinally and at the juncture of the handle with the butt of the bowl by flanges, substantially as hereinbefore set forth.

HENRY C. MILLIGAN.

Witnesses:
GEO. P. BENJAMIN,
REUNE J. D. DUNN.